United States Patent [19]
Proctor et al.

[11] Patent Number: 5,271,004
[45] Date of Patent: Dec. 14, 1993

[54] ASYNCHRONOUS TRANSFER MODE SWITCHING ARRANGEMENT PROVIDING BROADCAST TRANSMISSION

[75] Inventors: Richard J. Proctor; Thomas S. Maddern, both of Dorset, England

[73] Assignee: GPT Limited, England

[21] Appl. No.: 750,471

[22] Filed: Aug. 27, 1991

[30] Foreign Application Priority Data

Sep. 5, 1990 [GB] United Kingdom ............... 9019340

[51] Int. Cl.$^5$ ............................................ H04Q 11/04
[52] U.S. Cl. ................................... 370/60; 370/94.1
[58] Field of Search ................ 370/58.1, 58.2, 58.3, 370/60, 82, 94.1, 60.1; 340/825.52

[56] References Cited

U.S. PATENT DOCUMENTS

| | | | |
|---|---|---|---|
| 4,603,416 | 7/1986 | Servel et al. | 370/60 |
| 4,884,264 | 11/1989 | Servel et al. | 370/94.1 |
| 4,910,731 | 3/1990 | Sakurai et al. | 370/60 |
| 4,947,388 | 8/1990 | Kuwahara et al. | 370/94.1 |
| 4,962,498 | 10/1990 | May, Jr. | 370/94.1 |
| 5,062,106 | 10/1991 | Yamazaki et al. | 370/60 |

*Primary Examiner*—Benedict V. Safourek
*Assistant Examiner*—Alpus H. Hsu
*Attorney, Agent, or Firm*—Kirschstein, Ottinger, Israel & Schiffmiller

[57] ABSTRACT

An asynchronous transfer mode switching arrangement includes a serial to parallel converter arranged to receive input packets of data, which include routing information, in serial form and convert the packets of data to parallel form. A first random access memory is provided in which each packet of data is entered at an addressed location into the memory, and the address is entered in a respective first-in first-out output queue at the tail. The address at the head of the queue is accessed and the packet of data is read from the first random access memory into a parallel to serial converter and the packet of data is serially delivered to the associated output. The first random access memory and the output queues are controlled by a memory management arrangement to which is connected a broadcast channel routine second random access memory. The memory management arrangement addresses the broadcast channel routine second random access memory with channel index information, and receives information identifying the required output ports.

3 Claims, 3 Drawing Sheets

Fig.2.

| SYNCHRONISATION OCTET | | |
|---|---|---|
| ROUTING TAG 1 (6 BITS) | MODULE SIGNAL | PARITY |
| ROUTING TAG 2 (6 BITS) | MODULE SIGNAL | PARITY |
| ROUTING TAG 3 (6 BITS) | MODULE SIGNAL | PARITY |
| ROUTING TAG 4 (6 BITS) | MODULE SIGNAL | PARITY |
| ROUTING TAG 5 (6 BITS) | MODULE SIGNAL | PARITY |
| HOUSEKEEPING (3 BITS) / SPARE (3 BITS) | PRIO | PARITY |
| SEQUENCE NUMBER (6 BITS) | SPARE | PARITY |

Fig.3.

| ROUTING TAG N (6 BITS) | MS = 0 | PARITY |
|---|---|---|

Fig.4.

| CLASSIFICATION DEPENDENT (4 BITS) | CELL TYPE | MS = 1 | PARITY |
|---|---|---|---|

Fig. 5.

| INDEX B0 | INDEX B1 | INDEX B2 | INDEX PARITY | CELL TYPE (2 BITS) | MODULE SIGNAL | OCTET PARITY |
|---|---|---|---|---|---|---|
| INDEX B3 | INDEX B4 | INDEX B5 | INDEX PARITY | CELL TYPE OR CHECK PATTERN | MODULE SIGNAL | OCTET PARITY |
| INDEX B6 | INDEX B7 | INDEX B8 | INDEX PARITY | CELL TYPE OR CHECK PATTERN | MODULE SIGNAL | OCTET PARITY |
| INDEX B9 | INDEX B10 | INDEX B11 | INDEX PARITY | CELL TYPE OR CHECK PATTERN | MODULE SIGNAL | OCTET PARITY |
| INDEX B12 | INDEX B13 | INDEX B14 | INDEX PARITY | CELL TYPE OR CHECK PATTERN | MODULE SIGNAL | OCTET PARITY |

NOT ROTATED | MAY BE ROTATED | ROTATED

Fig. 6.

(USER NETWORK INTERFACE)

| | 8 7 6 5 | 4 3 2 1 |
|---|---|---|
| 1 | FLOW CONTROL (4) | VPI (4) |
| 2 | VPI (4) | VCI (4) |
| 3 | VCI (8) ||
| 4 | VCI (4) | PT(2) RES CLP |
| 5 | HEC (8) ||
| | 48 OCTETS OF INFORMATION ||

(NETWORK NETWORK INTERFACE)

| 8 7 6 5 | 4 3 2 1 |
|---|---|
| VPI (8) ||
| VPI (4) | VCI (4) |
| VCI (8) ||
| VCI (4) | PT(2) RES CLP |
| HEC (8) ||
| 48 OCTETS OF INFORMATION ||

ASYNCHRONOUS TRANSFER MODE SWITCHING ARRANGEMENT PROVIDING BROADCAST TRANSMISSION

BACKGROUND OF THE INVENTION

1. Field of the Invention

The present invention relates to an asynchronous transfer mode switching arrangement providing broadcast transmission.

2. Description of Related Art

In the field of broad band telecommunications networks a requirement has arisen for a switching system that can also handle broadcast TV transmissions.

A switching system based on asynchronous transfer mode (ATM) switching techniques can provide broadcast TV services which are currently in demand by customers.

Such an ATM switching arrangement is described in co-pending U.K. Patent Application No. 8917530.1, which is incorporated herein by reference thereto. The switching arrangement uses routing tags, one for each stage that indicates from which port in the stage the cell is to be transmitted from. The tags are suitable for point to point connections but not for fanouts. In order to provide a broadcast service for TV channels it would be necessary to provide fanouts from such a switching arrangement.

SUMMARY OF THE INVENTION

An object of the present invention is to modify the ATM switching arrangement so that it provides fanouts to enable broadcast transmissions to be effected.

According to the present invention there is provided an asynchronous transfer mode switching arrangement comprising a serial to parallel converter arranged to receive input packets of data, which include routing information, in serial form and convert the packets of data to parallel form, a first random access memory is provided in which each packet of data is entered at an address location in the first random access memory, and the address is then entered in a respective first-in and first-out output queue at the tail and the address at the head of the queue is accessed and the packet of data is read from the first random access memory into a parallel to serial converter and the packet of data is serially delivered to a required output, characterised in that the first random access memory and the output queues are controlled by a memory management arrangement, said memory management arrangement being connected to a second random access memory which is arranged to receive channel index information from the memory management arrangement and generate information identifying required output ports to which information is to be broadcast.

BRIEF DESCRIPTION OF THE DRAWINGS

An embodiment of the present invention will now be described, by way of example, with reference to the accompanying drawings in which:

FIG. 2 shows a table of existing internal header information as used by a switching arrangement without the broadcast facility, FIG. 3 shows a typical routing tag for ordinary traffic, FIG. 4 shows a modified routing tag for use with a broadcast facility, FIG. 5 shows the use of five routing tags which are necessary to implement the present invention, and;

FIG. 6 shows a typical ATM cell structure.

DETAILED DESCRIPTION OF THE PREFERRED EMBODIMENT

Figure 1:
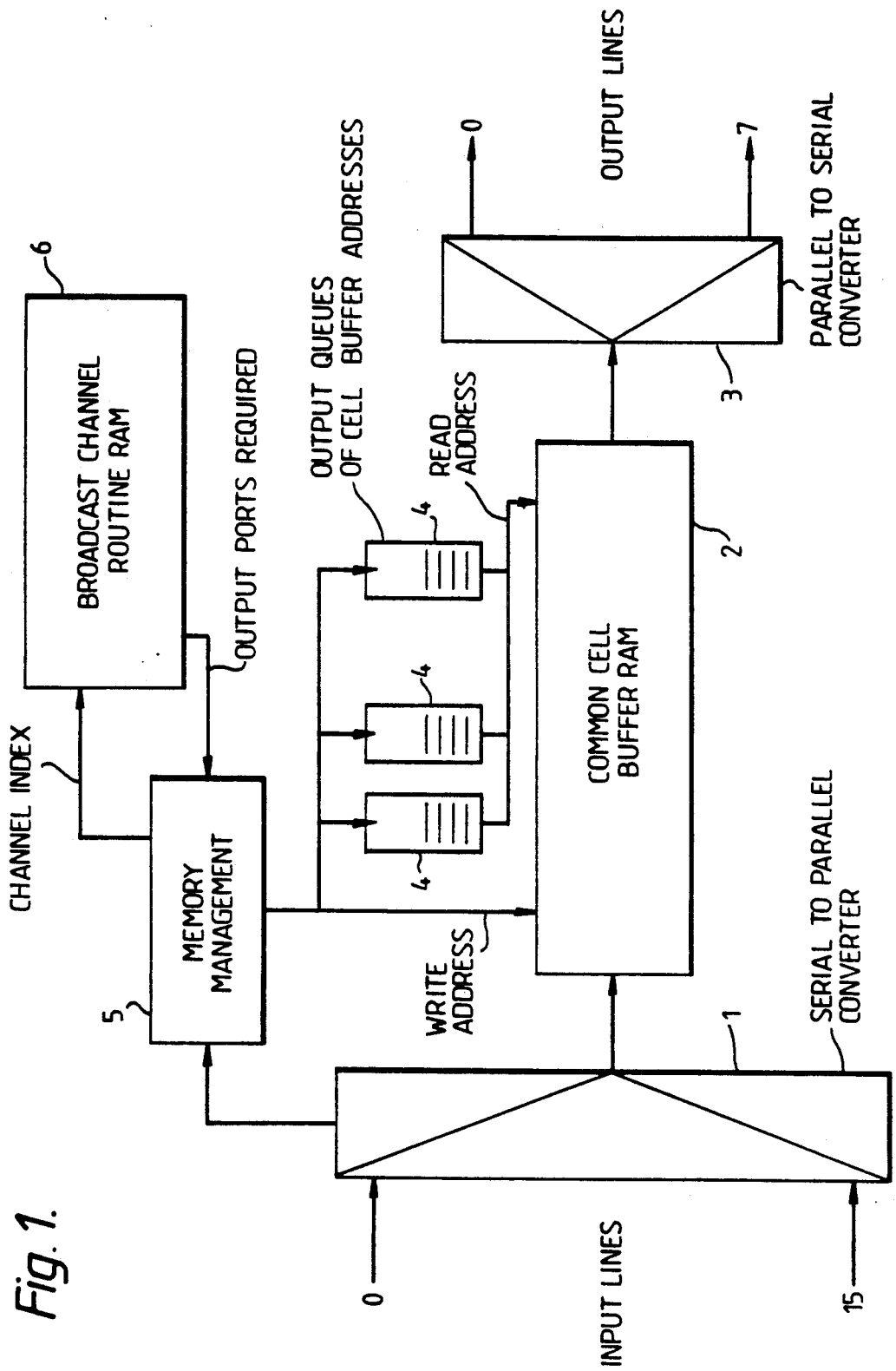
FIG. 1 shows a block diagram of the switching arrangement including a broadcast facility.

Referring to FIG. 1, a switching arrangement is shown comprising a serial to parallel converter 1 arranged to receive 16 input lines designated 0 to 15. The serial to parallel converter 1 is connected to a common cell buffer random access memory (RAM) 2, which routes each cell of information to a parallel to serial converter 3 from which information is outputted on lines 0 to 7. The random access memory 2 is controlled by a number of output queues 4 which hold the output buffer addresses for controlling the random access memory 2. A memory management system 5 controls the writing of address information into the random access memory 2, and also controls the transfer of information to the output queues 4. The memory management system 5 is controlled by a clock signal generated from the serial to parallel converter 1. The above elements of the switching arrangement are described in greater detail in the above referenced co-pending United Kingdom patent application.

The present invention provides an enhancement to the switching arrangement whereby a further random access memory 6 is provided, in which is stored broadcast channel routines. The random access memory 6 receives broadcast channel index information from the memory management system 5 and generates output signals to the memory management system identifying the required output ports. This information is passed in to the respective output queue from which a read address is ultimately taken in order to identify the required output port.

Referring to FIG. 2, an existing internal header diagram is shown comprising a synchronisation octet 10, routing tags 11 are identified as routing tags 1 to 5, each comprising 6 bits and each further comprising a module signal bit and a parity bit 12 and 13 respectively.

The five tags are rotated in each stage, and if the top tag has bad parity it is thrown away, otherwise it is used to route a cell of information. After routing the parity is inverted. This prevents cells being caught in loops between stages of the switch if the rotation fails or the wrong routing information is used. The above describes how the five tags are used in relation to a switching arrangement without the broadcast facility. When the broadcast facility is provided the above protection provided by the parity remains for the broadcast cells.

Referring to FIG. 3, a tag is shown for use with ordinary traffic. It provides a routing tag N (6 bits), a module signal which is designated 0 and a parity bit. The whole eight bits are rotated for each stage and the parity is inverted.

The present invention resides in the modification of the tag fields for other purposes such as broadcast transmissions.

FIG. 4 shows a typical tag for use with broadcast transmissions. The routing tag field, comprising 6 bits, is now used to provide a 4 bit classification dependent identity and a 2 bit cell type. The module signal bit is now represented by a binary 1 and the parity remains. The cell type can be used to indicate the following: If the two bits are designated 0 the cell may be used by the switching device itself under normal operation. If the cell type is designated by a 01 or 11 this represents that the cell is reserved for future use. However, if the cell type is designated 10 it indicates that the cell is for use as a broadcast cell.

For a broadcast cell only 2 or 4 bits (the module signal and parity and possibly the cell type) are rotated at each stage, and the parity is invalidated to prevent cell looping.

A classification dependent field is then used to hold three index bits and special parity in each tag octet. The parity bit is necessary to ensure that the octet main parity remains the same even after the module signal bit, parity and cell types are rotated, hence the main parity bit remains valid even though it is not over the same actual data.

The three index bits in each of the 5 tag octets can be used to give a 15 bit address. This is sufficient to address 32K of broadcast channels which would be quite sufficient to handle the required broadcast channels.

For messages to the switching device (cell type 00) there will be N ordinary tags to allow the cell to be routed to the device it is intended for, and then one tag with the module signal bit set and cell type 00 to extract the cell. For fanout messages the cell type in the first tag is set to indicate fanout.

Referring to FIG. 5 the five routing tag octets are shown with the classification dependent field modified as discussed above. The index B14 to B0 give 15 bits of absolute index for broadcast. The index is to the broadcast channel routine RAM 6 that is as wide as the number of outgoing ports the device has. When the switching devices are cascaded to produce the 32×32 elements out of 16×8 then only the last stage in the cascade needs to fanout. Each switching device still needs only to hold enough memory for the number of ports it actually has i.e. 8 bits per broadcast channel, it does not need the whole information for the larger 32×32 element size.

As can be seen from FIG. 5 the first octet comprises index B0 to B2 an index parity, the cell type, module signal and octet parity. Tag 2 comprises index B3 to B5, an index parity, the cell type or check pattern, a module signal and octet parity. Tag 3 comprises index B6 to B8, an index parity, the cell type or check pattern, a module signal and octet parity. Tag 4 comprises index B9 to B11, an index parity, the cell type or check pattern, a module signal and octet parity. Tag 5 comprises index B12 to B14, an index parity, the cell type or check pattern, a module signal and octet parity. The octet parity and module signal are rotated to provide the necessary security. The cell type or check pattern may be rotated but the index and index parity are not rotated.

A typical cell used in the present system is shown in FIG. 6 for a user network interface and a network interface. It comprises a 5 octet header and a 48 octet information field. The header comprises an optical flow control field of 4 bits, a Virtual Path identifier VPI field of 8 or 12 bits, a Virtual Channel identifier VCI field of 16 bits, a Payload Type Identifier PT of 2 bits, a Reserved bit RES, a Cell Loss Priority bit CLP, and a Header Error Control field HEC of 8 bits. The VPI and VCI together (VPI:VCI) identify a cell belonging to a specific virtual channel. The virtual channel is so called because the connections between users are held in memories and are not actual physical paths. This means that a connection only uses bandwidth on the physical interconnect when packets are transmitted, leaving these lengths free for other traffic in the intervening periods. The setting up of a connection involves the establishment of a virtual channel across the network to the destination terminating equipment. Fixed routes are established through the network for virtual channels which allows cell sequence integrity to be maintained.

A typical arrangement for a switch architecture described as above comprises line termination equipment which is connected to an Exchange Termination (ET) which contains a Header Translation Unit (HTU). The Header Translation Unit translates the current VPI:VCI into a new VPI:VCI for subsequent network nodes and adds the routing tags for routing the cell through the current switch network to the appropriate switch output port.

At the outgoing Exchange Termination (ET) the same VPI:VCI value can be sent to all customers who want a broadcast channel. Under these circumstances the VPI:VCI can be translated at the receive exchange termination. The exchange termination also includes a Redundant Path Combiner Unit (RPCU). It takes an input from two identical switch planes consisting of a multiplicity of switching elements, and decides which of the cells should be sent to line, and which are duplicates. On checking a sequence number, the RPCU decides if a cell is to be passed or disregarded. In the above instance where the VPI:VCI is translated at the receive ET, the RPCU would not need to be changed. A set of VPI:VCI values are reserved for the broadcast applications, and this may be done by the use of a VPI for all outgoing broadcast channels and the use of different VCI's for the different actual services.

If different VPI:VCI's are needed then there would be a requirement for outgoing translation. The RPCU would then be arranged to set the outgoing VPI:VCI values for the fanout channels.

The above description has been one embodiment of the present invention and it would be appreciated by those skilled in the art that alternative arrangements within the spirit and scope of the present invention are possible. For example the above description is limited to the broadcasting of one copy of the cell to each output port. It will be appreciated that multiple broadcasts are possible under circumstances when an output port is shared by more than one customer and there is a need for different VPI:VCI values.

We claim:

1. An asynchronous transfer mode switching arrangement, comprising: a serial to parallel converter having inputs to receive input packets of data which include routing information, in serial form, and convert the input packets of data to parallel form, said serial to parallel converter being connected to a first random access memory in which each input packet of data is entered at an address location in the first random access memory, and the address is then entered in a respective first-in and first-out output queue at the tail, and the address at the head of the queue is accessed, and the packet of data is read from the first random access memory into a parallel to serial converter connected thereto, and the packet of data is serially delivered to a required output of the parallel to serial converter, wherein the first random access memory and the output queues are controlled by a memory management arrangement connected thereto, said memory management arrangement being further connected to a second random access memory containing broadcast channel routines which is arranged to receive channel index information from the memory management arrangement and generate information identifying required output ports to which information is to be broadcast.

2. An asynchronous transfer mode switching arrangement as claimed in claim 1, wherein the routing information forming a part of each input packet of data comprises a section identifying a classification dependent field and a section identifying a cell type, wherein the cell type section is used to identify that the packet of data is a broadcast cell.

3. An asynchronous transfer mode switching arrangement as claimed in claim 2, wherein the classification dependent field comprises a plurality of index bits and a parity bit, wherein the plurality of index bits are used to address a location within the first random access memory which defines an address of a required output port contained within the first random access memory.

* * * * *